April 6, 1948.  H. WOLCOTT  2,439,354
SUPERVISORY SIGNAL SYSTEM FOR WATER SOFTENERS
Filed April 9, 1945
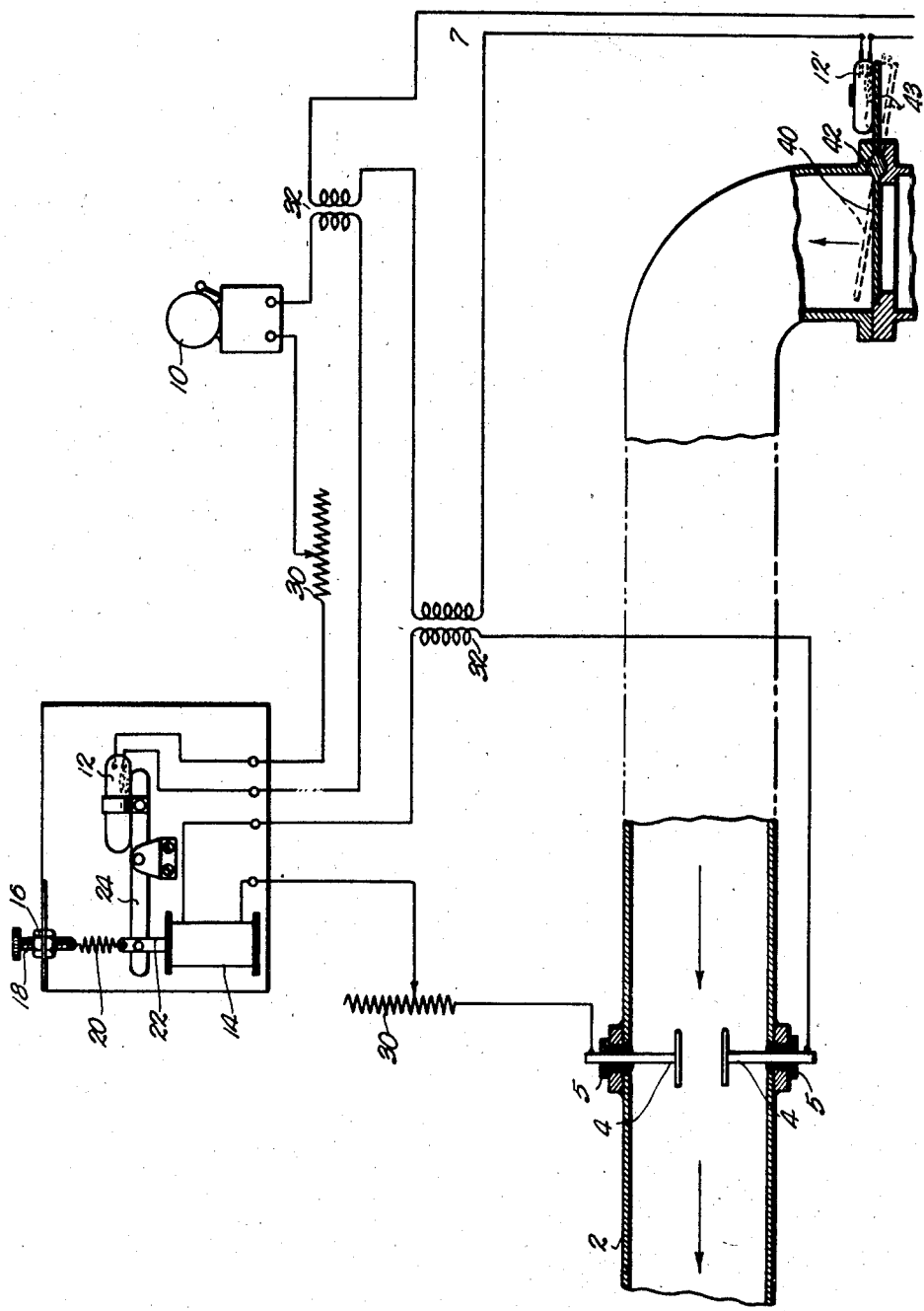
INVENTOR.
Herbert Wolcott
BY Chas. W. Gerard
ATTORNEY Patented Apr. 6, 1948

2,439,354

UNITED STATES PATENT OFFICE 2,439,354

SUPERVISORY SIGNAL SYSTEM FOR WATER SOFTENERS

Herbert Wolcott, Columbia, Mo.

Application April 9, 1945, Serial No. 587,405

2 Claims. (Cl. 177—311)

The present invention relates to testing means or equipment particularly designed for use in connection with water-softening apparatus for the purpose of ascertaining whether a given standard or degree of softness of the water is being maintained, and also to make known whenever the water has acquired a degree of hardness which is in excess of a given limit or maximum.

Accordingly it is a primary object of the present invention to provide a testing procedure which utilizes the varying electrical conductivity of the water subject to test, as the basis for said procedure, in the carrying out of which the decreasing conductivity of the water undergoing the test (which corresponds to increasing hardness thereof) determines the character of the result of the test.

A practical method of conducting my improved testing procedure is to constitute a portion of the water flow to be tested as a part of the path of an electric circuit, so that any appreciable variation in the conductivity of the water as a conducting medium, due to varying hardness thereof, will be at once indicated by the response of indicating means (or other suitable electrically-actuated means) also included in said electric circuit.

Hence as a means of practising the improved testing method I provide means for projecting suitable electrodes in the path of flow of the water to be tested, together with appropriate electrically actuated means, responsive to a material decreased in the current flow, for either producing a visible or audible signal, or automatically acting to control the action of the softener unit, as hereinafter explained.

With the foregoing general objects in view, I will now describe my improvements by reference to the accompanying drawing illustrating one approved method of practising the invention, following which those features and combinations thereof deemed to be novel and patentable will be particularly set for and claimed.

In the drawing, the view shown represents a schematic diagram illustrating a form and arrangement of testing apparatus which is adapted for the practice or operation of the present invention.

Referring to said drawing in detail, I illustrate therein the application of my improved testing procedure to the flow of water as it passes through a service pipe 2 from the water softening unit to the point of use.

In the path of said water flow I project a pair of insulated electrodes 4, extending from opposite directions, and also mounted adjustably, as by means of insulating screw plugs 5, for varying the space between the inner terminals of the electrodes, and hence the extent of the conducting path of the water which is thus constituted as the conducting medium across the space between said electrodes.

The electrodes 4 are included in an ordinary electric circuit 7, in which is also included an electric signal or alarm 10 or any other desired or preferred type of electrically-actuated device. In the same circuit is further included a suitable relay unit comprising an automatic switch 12 which may be of the well-known mercoid type adapted to be actuated by a solenoid device 14 which may be conveniently regulated by means of a nut 16 and screw 18 connected with a spring 20 attached to the armature 22 of the solenoid magnet which, in turn, controls the arm 24 carrying the switch element 12, as shown.

In the same electric circuit 7 I also provide appropriate transformer elements 32 as well as suitable resistor units 30 for primarily controlling the resistance offered by such relay portion of the circuit.

As the flow of water takes place, from the softener unit through the pipe 2, more or less current through the relay portion of the circuit is conducted by the water across the gap between the inner ends of the electrodes 4. This current flow is at a maximum so long as the hardness of the water is kept within the degree or standard of softness designed to be maintained by the operation of the softener equipment; and under these operating conditions the adjustment of the relay circuit, such as the regulation of the resistors 32 and of the tension of the spring 20, and the distance between the electrodes 4, is designed to maintain the switch 12 in circuit-open position, so that no operation of the signal element, or other electrically-actuated unit, will occur, in the absence of any variation of the relay current.

However, as soon as an increase occurs in the degree of hardness of the water flowing past the electrodes, this will be accompanied by a diminished conductivity in the water and hence a decrease in current flow between the electrodes and through the relay circuit. Consequently the switch-carrying arm 24 will be released to the action of the spring 20, thereby simultaneously causing the switch 12 to close the signal circuit and thus produce an automatic operation of the signal 10 or other electrically-actuated device located in said circuit.

It is thus apparent that a simple and practical as well as very efficient type of electric testing means is provided for carrying out the desired objects of my invention, by the operation of which an accurate test is made as regards the degree of softness of the water being delivered by the water-softening unit; and on failure of said softening unit to deliver water of the required standard of softness, that fact will be immediately indicated by the automatic alarm signal, which may be either an audible signal as shown, or a light bulb, if preferred. Moreover, if it should be desired to substitute other electrically-actuated means, such as a suitable control for automatically starting the regeneration of the softener unit, such substitution could readily be made and controlled by means of a suitable type of switch device for that purpose.

It will be understood that the adjustable nut 16 and screw 18 provide means for adjusting and varying the sensitiveness of the relay function; and moreover, further regulation may be conveniently secured by suitable adjustment of the resistor units 32, or of the electrodes 4 for varying the gap between them, and hence the extent of the conducting path of the relay current through the water undergoing the test for hardness.

To avoid the heating effect of the current when the relay circuit is closed and in operation, I arrange to limit the operation to only those periods when the softener apparatus is also in operation and water is flowing through the service pipe 2. This result is accomplished by installing a suitable check valve 40 in the pipe 2, which is so arranged as to automatically open and close in response to the water flow or interruption of said flow respectively; in the drawing this valve is shown pivoted at 42 and provided with an exterior arm 43 carrying a mercoid switch 12' for controlling the opening and closing of the electric circuit 7. Thus any excessive heating effect is avoided by virtue of the fact that the electric testing circuit is closed and in operation only during the times when the water softener apparatus is also in operation.

While I have illustrated and described what I now regard as the most practical and satisfactory form of equipment for the practice of my improved method or process I desire to be understood as expressly reserving the right to make such changes or modifications as may fairly be deemed to fall within the spirit and scope of my invention as defined by the appended claims.

Having thus described my invention, what I claim and desire to secure by Letters Patent is:

1. Apparatus for testing water as to its hardness comprising, a conduit for passage of the water to be tested, an electric signal circuit provided with electrodes mounted in spaced relation in the path of the flow of water through said conduit, a circuit-breaking device included in said signal circuit, and a valve pivotally mounted within said conduit and having an exterior arm carrying said circuit-breaking device, whereby said valve is actuated by the flow of water through said conduit for automatically operating said device to maintain said circuit closed only when a normal flow of water is taking place through the conduit.

2. Apparatus for testing the hardness of water in soft water servicing lines, comprising a service pipe for conducting the water from a water softening unit, electrodes forming part of an electric signal circuit and projecting through the wall of said pipe to the interior thereof, means for adjustably supporting said electrodes in spaced relation and directly in the path of flow of the water through said service pipe and thereby constituting the water flowing between the electrodes as part of the conducting medium of said electric circuit, and circuit-interrupting means controlled by the flow of water to be tested for making and breaking said circuit.

HERBERT WOLCOTT.

REFERENCES CITED

The following references are of record in the file of this patent:

UNITED STATES PATENTS

| Number | Name | Date |
| --- | --- | --- |
| 453,484 | Jewell | June 2, 1891 |
| 894,468 | Smith | July 28, 1908 |
| 1,320,036 | Crockatt | Oct. 28, 1919 |
| 1,953,546 | Wills | Apr. 3, 1934 |
| 2,003,760 | Sweeney et al. | June 4, 1935 |